United States Patent [19]

Edmaier et al.

[11] 4,098,077
[45] Jul. 4, 1978

[54] MOBILE POWER UNIT HOUSING

[75] Inventors: Franz Edmaier, Markdorf; Einhart Grunert, Tettnang; Ulrich Herms, Kressbronn, all of Fed. Rep. of Germany

[73] Assignee: Motoren-und Turbinen-Union Friedrichshafen GmbH, Fed. Rep. of Germany

[21] Appl. No.: 767,973

[22] Filed: Feb. 11, 1977

[30] Foreign Application Priority Data

Feb. 14, 1976 [DE] Fed. Rep. of Germany ....... 2605941

[51] Int. Cl.² .............................................. H02P 9/04
[52] U.S. Cl. ........................................ 60/272; 52/64; 123/41.7; 290/1 R
[58] Field of Search ............... 60/272, 319; 123/41.56, 123/41.59, 41.64, 41.65, 41.7; 52/64, 71; 229/17 B; 290/1 R, 1 B, 1 A; 206/319, 216

[56] References Cited

U.S. PATENT DOCUMENTS

| 1,648,875 | 11/1927 | Griese | 290/1 A |
| 2,789,234 | 4/1957 | Lambert | 290/1 R |
| 3,566,142 | 2/1971 | Dabell | 290/1 R |
| 3,667,172 | 6/1972 | Erickson | 52/64 |
| 3,714,449 | 1/1973 | Bella | 290/1 R |
| 3,791,682 | 2/1974 | Mitchell | 290/1 R |
| 3,964,462 | 6/1976 | Thien | 123/41.7 |

FOREIGN PATENT DOCUMENTS 1,406,814   6/1965   France ................. 290/1 R

Primary Examiner—Douglas Hart
Attorney, Agent, or Firm—Craig & Antonelli

[57] ABSTRACT

A housing in the form and size of a freight container in which a machine aggregate driven by an internal combustion engine together with its accessories can be permanently stored and operated; guide surfaces are thereby arranged in front of the openings in the end face at the housings for the supply and discharge of cooling air, combustion air and exhaust gases, which are formed by flaps connected with the housing bottom by means of hinges and pivotal into an angular position relative to the end faces of the housing.

36 Claims, 4 Drawing Figures

MOBILE POWER UNIT HOUSING

The present invention relates to a housing in the form and size of a freight container, in which a machine aggregate driven by an internal combustion engine together with all of its accessories is permanently accommodated and in which the same can also be operated.

The purpose of such a housing is to render a machine aggregate, for example, an emergency power unit, capable of transport and to be able to use the machine aggregate at any desired location protected against environmental influences.

A transportable emergency power unit is known which together with its auxiliary installations is accommodated in a freight container.

The environmental annoynace which occurs during the operation as a result of the blowing effect of the unprotected exhaust air discharge and of the suction effect at the freely accessible inlet openings is disadvantageous with this known emergency power aggregate. Also the selection of a set-up location of the emergency power unit is limited thereby to sufficiently form and clean, preferably paved places because otherwise dirt thrown up by the exhaust air stream and sucked in by way of the inlet openings may lead to endangering the operation of the auxiliary power unit. Additionally, by reason of the inlet and outlet openings which cannot sufficiently be closed, the universal freightability is impaired, especially in ocean transport or ocean freight.

It is therefore the task of the present invention to develop a housing for the installation of a machine aggregate capable of being freighted at any time by all means of transportation, which enables an operation favorable to the environment as well as a simple servicing and repair of the machine aggregate at all places of use.

The underlying problems are solved according to the present invention in that guide surfaces are arranged in front of the openings in the end faces of the housings for the inlet and discharge of cooling air, combustion air and exhaust gases, which are formed by pivotal flaps connected with the housing bottom by means of hinges and pivotal into an angular position to the end faces of the housing.

The flap on the exhaust air side corresponds according to the present invention approximately to the housing width whereas the flap on the supply air side extends from a housing outer edge up to the door disposed at the end face of the housing of a switching and control cabinet arranged adjacent the inlet opening and also accessible from the outside.

Each air guide surface is completed according to the present invention into an air guide channel by side walls between the flap and the end face of the housing.

Owing to the exhaust air stream deflected upwardly by the air guide channel and to the supply of the supply air out of the space above the housing, it is possible to set the machine aggregate into operation at any suitable location without environmental pollution or annoyance.

The air guide channels prevent, on the one hand, the whirling up and sucking-in of dirt, sand or dust and, on the other hand, the direct horizontal expansion of the sound still leaving the inlet and discharge openings.

In order to protect the openings in the end faces of the housings and to increase the rigidity of the housing, the flaps are reinforcingly connected according to the present invention with the housing in the closed condition for the transport of the housing.

After the closing of the flaps, the housing is closed tightly and is ready also for ocean freight without any further measures. Additionally, the reinforcing connection of the flaps with the housing assures the multiple stackability required for freight containers.

An installation, for example, a cable reel is mounted on the inside of the housing according to the present invention which facilitates the pivoting of the flaps.

The side walls of the air guide channels for the purpose of the transport are secured according to the present invention at a mechanism which is arranged on the flap side facing the end face of the housing.

A further feature of the present invention is the construction of at least one flap as passable or travellable ramp for the problem-free installation and removal of the machine aggregate, for which purpose reinforcements are arranged at the flap perpendicular to its pivot axis.

In an advantageous manner, the reinforcement of the flap is constructed according to the present invention as roller track for transport rollers arranged at the machine aggregate.

According to the present invention, the roller track continues on the housing bottom in the interior of the housing and includes preferably rails for the lateral guidance of the transport rollers.

The three aforementioned features makes it possible to undertake the installation and removal of the machine aggregate without the aid of lifting tools. The machine aggregate can be displaced manually on the roller track by means of the transport rollers arranged at the base frame of the machine aggregate and can be rolled into or out of the housing in a simple manner.

According to a further feature of the present invention, supply air and exhaust air mufflers or silencers adjoin on the inside of the housing the openings in the end faces of the housing, whereby one bird-protecting screen each and one louver each are arranged on the outside of the silencers or mufflers and preferably the louver of the exhaust air side is constructed adjustable.

According to another feature of the present invention, a centrifugal dust separator is arranged at the outside of the muffler of the supply air side so that with a housing equipped therewith, the installed machine aggregate can remain in operation also under extreme conditions, for example, during a sand storm in desert areas.

The dust separated in the centrifugal dust separator is sucked off by a dust ejection blower which is arranged according to the present invention in the air guide channel of the supply air side.

The dust ejection blower is secured according to the present invention on the flap of the supply air side and the dust ejection channel terminates in the atmosphere through one of the side walls of the air guide channel.

A further feature of the present invention is the sound-absorbing coating of the inner side of each air-guide channel formed by a flap and side walls, whereby the sound emission of the housing is reduced with a running engine aggregate.

The exhaust gas lines terminate according to the present invention in the air guide channel through the two upper corners of the end face of the housing adjacent the exhaust air opening. It is achieved thereby that the exhaust gas mixes inside of the air guide channel with the exhaust air flowing in the upward direction and the environmental pollution by the exhaust gases is noticeably reduced.

According to the present invention, the exhaust gas lines are constructed with rectangular cross section between the exhaust gas muffler arranged on the inside of the housing underneath the cover and the air guide channel of the exhaust air side and are surrounded by a thermal and sound absorbing insulation. This space-saving accommodation of the exhaust gas lines makes it possible to construct the opening in the end face of the housing for the exhaust-air muffler with a large width so that a sufficiently wide assembly opening results for the installation and removal of the machine aggregate.

Accordingly, it is an object of the present invention to provide a housing in the form and size of a freight-container which avoids by simple means the aforementioned shortcomings and drawbacks encountered in the prior art.

Another object of the present invention resides in a housing for accommodating a machine aggregate driven by an internal combustion engine together with all of its accessories which can be operated at any desired location without unduly burdening the environment.

A further object of the present invention resides in a housing for accommodating a machine aggregate adapted to be driven by an internal combustion engine which can be set up in any desired location without regard to the condition of the ground and the likelihood of dust due to air turbulence.

Still a further object of the present invention resides in a housing of the type described above which permits an operation of the machine aggregate driven by an internal combustion engine in a manner acceptable to present-day environmental protection concepts and which enables simple service and repair of the machine aggregate.

Another object of the present invention resides in a housing which can be rendered ready for transport including ocean freighting by extremely simple means yet can be set up without difficulties for operation at any location.

These and other objects, features and advantages of the present invention will become more apparent from the following description when taken in connection with the accompanying drawing which shows, for purposes of illustration only, one embodiment in accordance with the present invention, and wherein.

Figure 1:
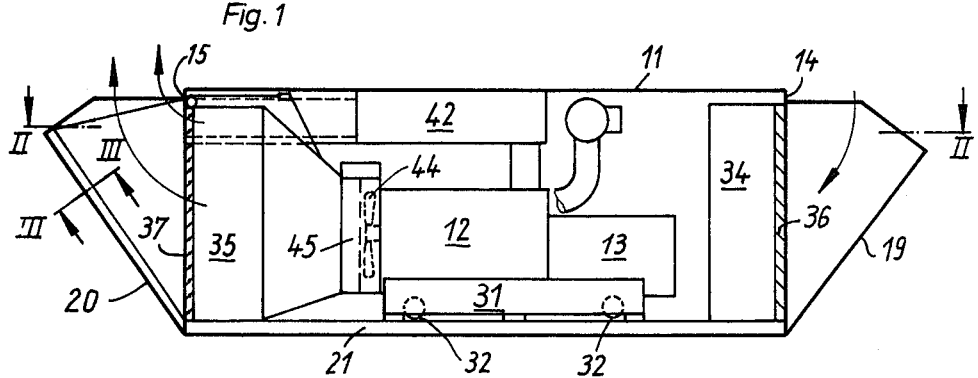
FIG. 1 is a longitudinal cross-sectional view through a housing with an installed machine aggregate in accordance with the present invention, taken along line I—I of FIG. 2.

Referring now to the drawing wherein like reference numerals are used throughout the various views to designate like parts, a machine aggregate, for example, consisting of internal combustion engine 12 and generator 13, together with all accessories, is accommodated in a housing 11 in the form and size of a freight container and can be operated therein.

Figure 2:
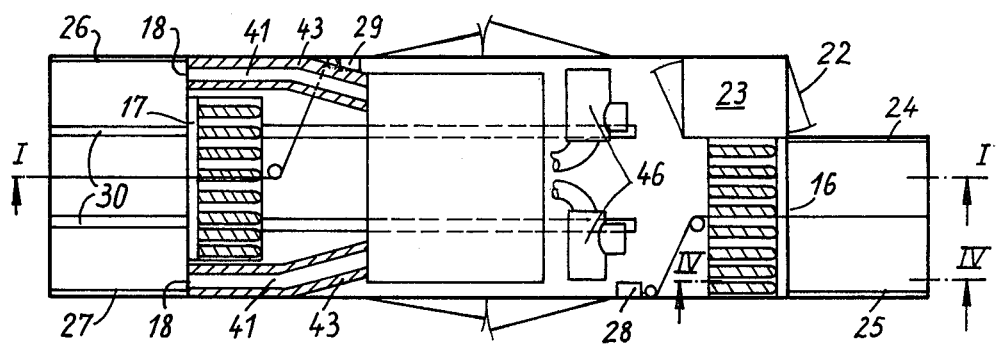
FIG. 2 is a cross-sectional view through a housing, taken along line II—II in FIG. 1, with the machine aggregate omitted from this view.

The cooling and combustion air required for the operation of the internal combustion engine is supplied by a blower 44 (FIG. 1). The air enters into the housing through an opening 16 (FIG. 2) at the end face 14 (FIG. 1) of the housing 11, flows through the radiator 45 and leaves the housing 11 at the other end face 15 (FIG. 1) through an opening 17 (FIG 2). Combustion air for the internal combustion engine 12 is removed from the air stream produced by the blower 44 inside of the housing 11 by way of air filters 46 (FIG. 2). Flaps 19 and 20 are arranged as air guide surfaces in front of the openings 16 and 17, which are connected with the housing bottom 21 by means of hinges (not shown) and are pivotal into an angular position to the end faces 14 and 15 of the housing 11.

The flap 20 on the exhaust air side corresponds approximately to the housing width. The flap 19 on the supply air side extends from a housing outer edge up to the door 22 (FIG. 2) of a switching and control cabinet 23 arranged adjacent the supply air opening 16 and also accessible from the outside.

Side walls 24, 25 and 26, 27 between each flap 19, 20 and the end walls 14, 15 of the housing complete the air guide surfaces into one air guide channel each.

For purposes of transporting the housing, 11, the flaps 19 and 20 are pivoted toward the end faces 14 and 15 and are reinforcingly connected with the housing 11. In this manner, the openings 16, 17 and 18 are protected and closed tightly so that the housing is ready for shipping without further measures and in this condition also has the multiple stacking ability required with freight containers.

Prior to the closing of the flaps 19 and 20 for the transport or shipment, the side walls 24, 25, 26, 27 of the air guide channels are secured at a mechanism on the flap side facing the end face 14 or 15 of the housing 11.

In order to facilitate the pivoting of the flaps 19 and 20 from the transport position into the operating position and vice versa, one cable reel each 28 and 29 (FIG. 2) is arranged on the inside of the housing 11 for each flap.

Figure 3:
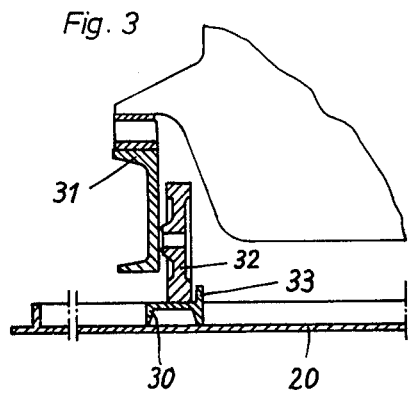
FIG. 3 is an enlarged cross-sectional view through the flap of the exhaust air side, taken along line III—III of FIG. 1.

The flap 20 at the end face 15 with the exhaust air opening 17 is constructed as passable ramp for the problem-free installation and removal of the machine aggregate. For this purpose, reinforcements 30 (FIG. 3) are arranged at the flap 20 which extend perpendicularly to the pivot axis of the flap and serve as roller track for transport rollers 32 (FIG. 3) mounted at the base frame 31 of the machine aggregate. The roller track continues in the interior of the housing 11 on the housing bottom 21 and includes rails 33 for the lateral guidance of the transport rollers 32 over the entire length.

Figure 4:
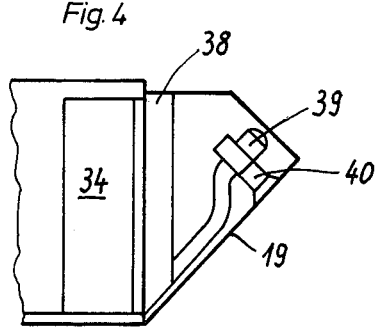
FIG. 4 is a partial longitudinal cross-sectional view, taken along line IV—IV of FIG. 2, with an installed centrifugal dust separator and dust ejection blower.

Supply air and exhaust air mufflers 34 and 35 adjoin the openings 16 and 17 on the inside of the housing 11. The outsides of the mufflers 34 and 35 are covered by one bird-protecting screen each and one louver or shutter each consisting of horizontal slats 36 and 37 (FIG. 1) as weather protection. The slats of the louver 37 on the exhaust air side are constructed adjustable. During standstill of the machine aggregate they are closed in order to preclude, for example, at low outside temperatures, an excessive cooling of the internal combustion engine 12 due to an air draft. A centrifugal dust separator 38 (FIG. 4) may be arranged on the outside of the muffler 34 of the supply air side, whereby a dust ejection blower 39 arranged in the air guide channel of the supply air side on the flap 19 ejects the separated dust into the atmoshphere through an opening 40 disposed in the side wall 25.

The inner sides of each respective air guide channel formed of a flap 19 or 20 and side walls 24, 25 or 26, 27 are lined with a sound-absorbing coating in order to reduce the sound emission of the housing with a running machine aggregate.

The exhaust gas lines 41 (FIG. 2) discharge into the air guide channel in the upper corners of the end face 15 of the housing adjacent the exhaust air opening 17. As a result thereof, the exhaust gas and exhaust air mix in the air guide channel and the environmental pollution by the exhaust gases is noticeably reduced.

In order to be able to construct the opening 17 of the exhaust air side which serves as installation opening for the machine aggregate, with the greatest possible width, the exhaust gas lines 41 are constructed with rectangular cross section between the exhaust gas muffler 42 arranged on the inside of the housing 11 underneath the cover and the air guide channel of the exhaust air side and are surrounded by a thermal and sound-absorbing insulation 43.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A housing at least approximately in the form and size of a freight container, in which a machine aggregate adapted to be driven by an internal combustion engine together with its accessories can be prermanently accommodated and operated, characterized in that guide surface means are provided in front of openings in end faces of the housing for the supply and exhaust of cooling air, combustion air and exhaust gases, said guide surface means including flap means operatively connected with a housing bottom by hinge means and pivotal into an angular position relative to the end faces of the housing means.

2. A housing according to claim 1, characterized in that the flap means on the exhaust air side corresponds approximately to the housing width whereas the flap means on the supply air side extends from a housing outer edge up to a door located in the corresponding end face of the housing of a swtiching and control cabinet arranged adjacent the supply air opening and accessible from the outside.

3. A housing according to claim 2, characterized in that each air guide surface means is completed into an air guide channel by side wall means between the flap means and the respective end face of the housing.

4. A housing according to claim 3, characterized in that the flap means in the closed condition are reinforcingly connected with the end face of the housing for purposes of shipping the housing.

5. A housing according to claim 4, characterized by means provided on the inside of the housing for pivoting the flap means.

6. A housing according to claim 5, characterized in that the last-mentioned means includes a cable winch.

7. A housing according to claim 5, characterized by securing means on the flap side facing the respective end face of the housing for securing the side walls during the shipment of the housing.

8. A housing according to claim 7, characterized by the construction of at least one flap means as passable ramp for the installation and removal of the machine aggregate, reinforcements being provided at said flap means which extend substantially perpendicularly to its pivot axis.

9. A housing according to claim 8, characterized in that the reinforcements of the flap means are constructed as roller track for transport rollers arranged at the machine aggregate.

10. A housing according to claim 9, characterized in that the roller track is extended on the housing bottom in the inside of the housing.

11. A housing according to claim 10, characterized in that the roller track includes rail means for the lateral guidance of the transport rollers.

12. A housing according to claim 10, characterized in that supply air and exhaust air mufflers adjoin the openings in the end faces of the housing on the inside of the housing, and in that one bird-protection screen means and one louver means each are arranged at the outside of the muffler.

13. A housing according to claim 12, characterized in that the louver means of the air exhaust side is adjustable.

14. A housing according to claim 12, characterized in that a centrifugal dust separator means is arranged on the outside of the muffler of the supply air side.

15. A housing according to claim 14, characterized in that a dust ejection blower means for the centrifugal dust separator means is arranged in the air guide channel of the supply air side.

16. A housing according to claim 15, characterized in that the dust ejection blower means is secured at the flap means of the supply air side and the dust ejection channel terminates in the atmosphere through one of the side walls of the air guide channel of the supply air side.

17. A housing according to claim 16, characterized by a sound-absorbing coating of the inner side of each air guide channel formed by a respective flap means and side walls.

18. A housing according to claim 17, characterized in that exhaust gas lines of the internal combustion engine terminate in the air guide channel through the two upper corners of the end face of the housing of the exhaust air opening.

19. A housing according to claim 18, characterized in that the exhaust gas lines are constructed with rectangular cross section between the exhaust gas muffler arranged in the interior of the housing underneath the cover and the air guide channel of the exhaust air side and are surrounded by a thermal and sound-absorbing insulation.

20. A housing according to claim 1, characterized in that each air guide surface means is completed into an air guide channel by side wall means between the flap means and the respective end face of the housing.

21. A housing according to claim 1, characterized in that the flap means in the closed condition are reinforcingly connected with the end face of the housing for purposes of shipping the housing.

22. A housing according to claim 1, characterized by means provided on the inside of the housing for pivoting the flap means.

23. A housing according to claim 22, characterized in that the last-mentioned means includes a cable winch.

24. A housing according to claim 1, characterized by securing means on the flap side facing the respective end face of the housing for securing the side walls during the shipment of the housing.

25. A housing according to claim 1, characterized by the construction of at least one flap means as passable ramp for the installation and removal of the machine aggregate, reinforcements being provided at said flap means which extend substantially perpendicularly to its pivot axis.

26. A housing according to claim 25, characterized in that the reinforcements of the flap means are constructed as roller track for transport rollers arranged at the machine aggregate.

27. A housing according to claim 26, characterized in that the roller track is extended on the housing bottom in the inside of the housing.

28. A housing according to claim 27, characterized in that the roller track includes rail means for the lateral guidance of the transport rollers.

29. A housing according to claim 1, characterized in that supply air and exhaust air mufflers adjoin the openings in the end faces of the housing on the inside of the housing, and in that one bird-protection screen means and one louver means each are arranged at the outside of the muffler.

30. A housing according to claim 29, characterized in that the louver means of the air exhaust side is adjustable.

31. A housing according to claim 29, characterized in that a centrifugal dust separator means is arranged on the outside of the muffler of the suply air side.

32. A housing according to claim 31, characterized in that a dust ejection blower means for the centrifugal dust separator means is arranged in the air guide channel of the supply air side.

33. A housing according to claim 32, characterized in that the dust ejection blower means is secured at the flap means of the supply air side and the dust ejection channel terminates in the atmosphere through one of the side walls of the air guide channel of the supply air side.

34. A housing according to claim 1, characterized by a sound-absorbing coating of the inner side of each air guide channel formed by a respective flap means and side walls.

35. A housing according to claim 1, characterized in that exhaust gas lines of the internal combustion engine terminate in the air guide channel through the two upper corners of the end face of the housing of the exhaust air opening.

36. A housing according to claim 35, characterized in that the exhaust gas lines are constructed with rectangular cross section between the exhaust gas muffler arranged in the interior of the housing underneath the cover and the air guide channel of the exhaust air side and are surrounded by a thermal and sound-absorbing insulation.

* * * * *